United States Patent [19]
Petrinovic

[11] 3,725,776
[45] Apr. 3, 1973

[54] ABSORPTION DETECTOR FOR NUCLEAR MAGNETIC RESONANCE MEASUREMENTS WITH A FREQUENCY CONTROL

[75] Inventor: Marko Petrinovic, Zagreb, Yugoslavia

[73] Assignee: Institute "Rudjer Boskovic", Zagreb, Yugoslavia

[22] Filed: Feb. 7, 1972

[21] Appl. No.: 224,042

Related U.S. Application Data

[63] Continuation of Ser. No. 6,250, Jan. 27, 1970, abandoned.

[52] U.S. Cl. .................................................324/0.5 R
[51] Int. Cl. .............................................G01n 27/78
[58] Field of Search .........324/0.5 R, 0.5 A, 0.5 AC, 324/0.5 HH, 0.5 MA

[56] References Cited

UNITED STATES PATENTS

| | | | |
|---|---|---|---|
| 3,209,242 | 9/1965 | Bell | 324/0.5 |
| 2,868,981 | 1/1959 | Costas | 331/25 |

OTHER PUBLICATIONS

G. V. H. Wilson, A Frequency Swept Nuclear Magnetic Resonance Abosrption Circuit-J. of Sci. Instr. 41(7), July, 1964, pp. 436–439

Primary Examiner—Michael J. Lynch
Attorney—Waters, Roditi, Schwartz & Nissen

[57] ABSTRACT

An absorption detector for determining nuclear magnetic resonance with automatic frequency control. The detector comprises a sample holder including coils, a reference oscillator including a tank circuit being coupled to these coils. A magnet is provided including modulating coils and power coils and having a gap in which the holder is positioned. The oscillator includes a low-noise amplifier and impedor, and a limiter connected in feedback relation with the amplifier via the impedor. A low-frequency amplifier is provided and a synchronous detector is coupled via the low-frequency amplifier to the low-frequency amplifier. An XY recorder is coupled to the synchronous detector, and a modulating oscillator is coupled to the modulating coils, the reference oscillator and the synchronous detector. A power supply is coupled to the power coils and to the XY recorder to determine the X position of the latter. An automatic control is provided which is coupled to the reference oscillator to control the frequency thereof.

4 Claims, 2 Drawing Figures

3,725,776

ABSORPTION DETECTOR FOR NUCLEAR MAGNETIC RESONANCE MEASUREMENTS WITH A FREQUENCY CONTROL

This application is a continuation of copending application Ser. No. 6250, filed on Jan. 27, 1970 and now abandoned.

FIELD OF INVENTION

This invention relates to absorption detectors for nuclear magnetic resonance measurements, and more particularly to detectors with frequency controls. The inventon relates further to detectors which detect only absorption components of magnetic resonance signals as is useful for precise research in the chemical, physical and bio-physcal fields.

BACKGROUND

Previously known equipment for the detection of nuclear magnetic resonance signals have been based on several basic electronic methods, i.e.:

a. an induction method using two crossed coils located arond the sample to be examined in the magnetic field;

b. an absorption method using the resonant "T" four poles; and c. an absorption mehod using a reference oscillator as the principal part of the detector of the nuclear magnetic resonance.

Methods (a) and (b) are used chiefly because of their sensibility and stability, but electronically they are complex and consequently expensive. Method (c) achieves simplicity with the same sensitivity and is more economical but less stable since no automatic control of frequency is provided.

SUMMARY OF INVENTION

An object of the invention is to provide an improved absorption detector for nuclear magnetic resonance measurements, the detector being provided with an automatic frequency control.

Another object is to provide a simple system with great sensitivity, which has a separate automatic frequency control of reference osicllator included in the detector.

A further object is to provide a loop for frequency stabilization constructed so that no superfluous statics will occur in the measuring system.

Yet another object is to provide an improved detector which possesses good detector characterstics with the ue of a reference oscillator witout the use of crystals, the frequency stability approaching the stability of a reference crystal oscillator.

Advantageously the detector, according to the invention, will have a sensitivity and a signal/noise ratio which is characteristic of a detector with a reference oscillator without crystals, and the frequency stability will be comparable to that of a crystal reference oscillator.

To achieve the above and other objects, the invention proposes the use of an absorption detector for determining nuclear magnetic resonance (NMR) with automatic frequency control. The detector comprises a sample holder including a coil wound around a sample, which is a part of the tank circuit of a reference oscillator. There is moreover a magnet including modulating and power coils and having a gap in which the holder is positioned. A low frequency (LF) amplitude modulation of the reference oscillator wave due to NMR signal is detected by an amplitude detector. After an LF amplification and a synchronous detection at the freqeency of magnetic field modulation by a modulating oscillator, the NMR signal is recorded on the XY recorder. During operation, the frequency of the reference oscillator is under control of an attached automatic control. In the frequency lock mode, th magnet power supply provides a magnetic field sweep and determines also the X postion of the XY recorder. In this case, the automatic control for a frequency control uses a stabilized D-C reference voltage. In the linear frequency sweep mode, the magnetic field is stable and the frequency of the reference oscillator is swept by the automatic control, under control of the referenee ramp voltage generator. The ramp voltage generator determines the X position of the XY recorder in the frequency sweep mode.

BRIEF DESCRIPTION OF DRAWING

The invention will be hereinafter described in detail with reference to the accmmpanying drawing wherein.

DETAILED DESCRIPTION

Figure 1:
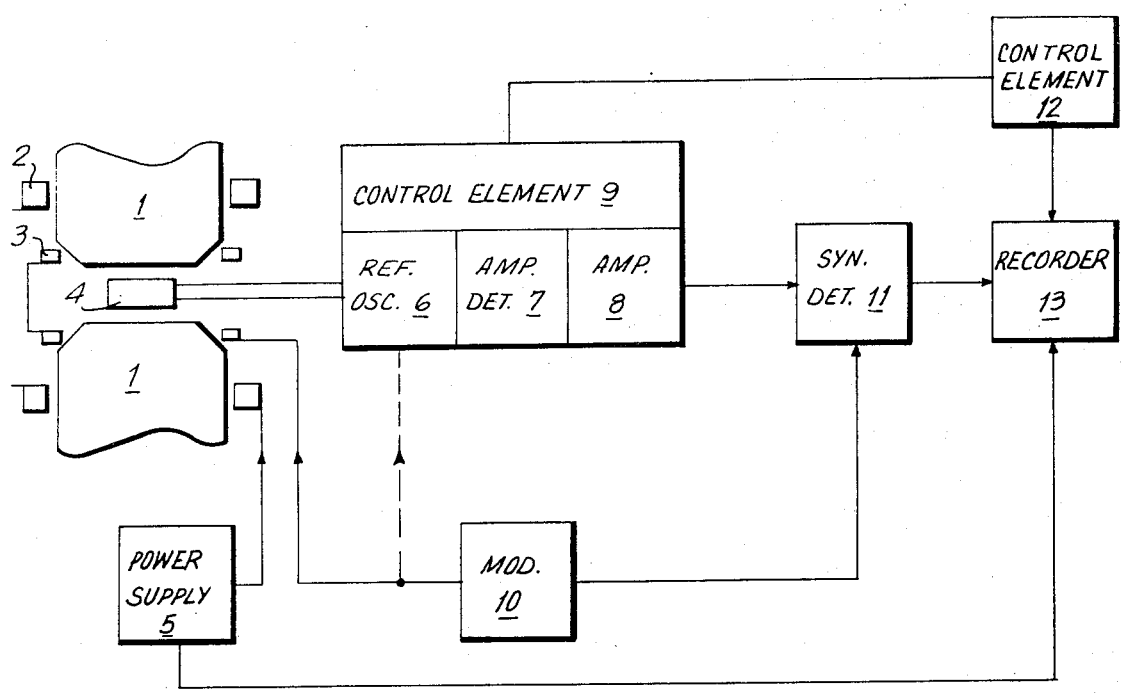
FIG. 1 is a block diagram of a detector for measuring nuclear magnetic resonance in accordance with the invention.

In the gap of a permanent magnet or electromagnet 1 is inserted a sample holder 4 in which is the coIl of a tank circuit for the determination of the frequency of oscillation of a reference oscillator 6 and into which the sample to undergo chemical examination is placed.

The reference oscillator 6 is connected to an amplitude detector 7 for detecting the absorption components of the nuclear magnetic resonance signal, which is the cause of changes in the oscillating amplitude. To make detection of the nuclear magnet resonance signal more simple, the induction of the static magnetic field or the frequency of the reference oscillator 6 is usually modulated by a low frequency modulating signal and the nuclear magnetic resonance appears as a low frequency modulation of the reference oscillator wave which is detected by an amplitude detector 7 and amplified by a low frequency amplifier 8 and then led via a cable to a synchronous detector 11, which is used to cause the nuclear magnetic resonance signal is usually small and concealed in noise and so that the signal/noise ratio might be improved up to as much as 40 db.

A reference signal of proper amplitude and phase for coherent detection is fed from the modulatng oscillator 10, by which the magnet1c field is modulated by means of a pair of modulating coil 3. Alternatively, the frequency of the reference oscillator 6 can be modulated by the modulating oscillator 10 using a varicap diode in the tank circuit of the reference oscillator.

The absorption nuclear magnetic resonance signal passes from the output of the coherent detector 11 to the XY recorder 13, where it is recorded.

Picking up a nuclear magnetic resonance signal by a slow sweep of the induction of a static magnetic field is accomplished through the use of a power supply 5 feeding a pair of cols 2 on the magnet pole-pieces 1. At the same time, this determines the X position of the XY recorder 13. During such measurements, the frequency stability of the reference oscillator 6 must be such that the nuclear magnetic resonance signal distortion due to small frequency instability can be neglected.

To achieve frequency stability of the reference oscillator 6, a special automatic control including elements 9 and 12 is added, with its principal function being that of providing a linear frequency sweep of the reference oscillator 6 (i.e., when the magnetic field is constant) as well as stabilizatinn of the frequency of the reference oscillator 6 in the case when the magnetic sweep is used for tking up the nuclear magnetic resonance signals. For the frequency sweep function, the automatic control element 12 also gives a signal for setting of the X position of the XY recorder 13.

Figure 2:
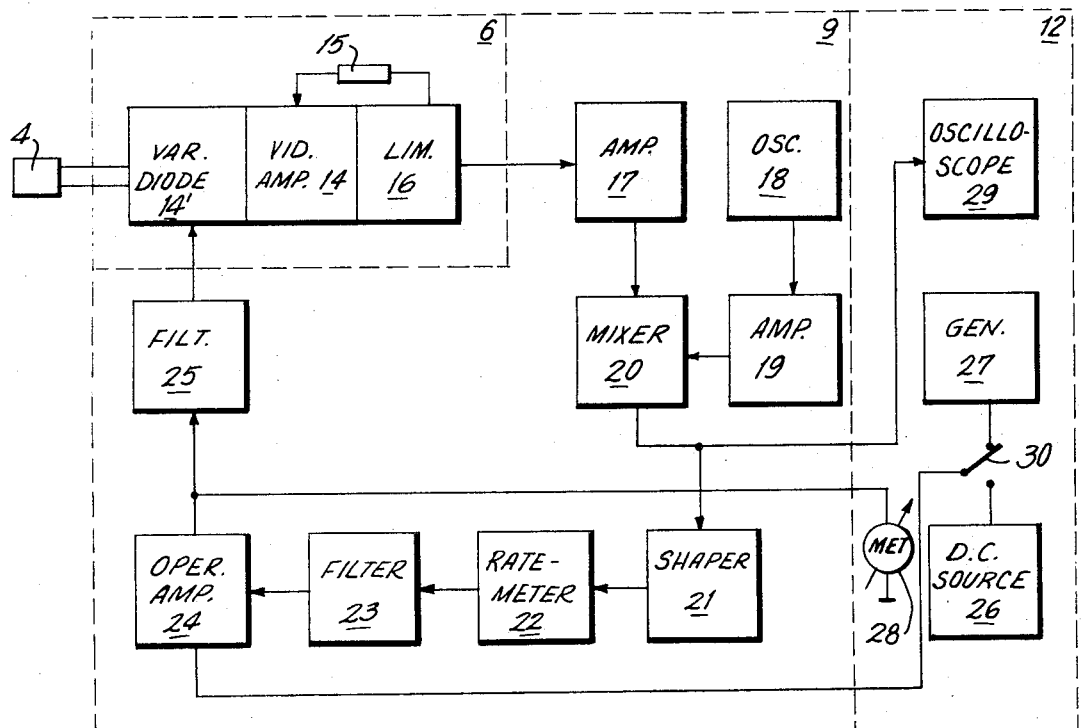
FIG. 2 is a block diagram of an automatic frequency control for the reference oscillator in the absorption detector.

FIG. 2 shows the connecton of the reference oscillator 6 with the automatic control elements 9 and 12, for maintaining a constant requency difference between the frequency of the reference oscillator 6 and the reference crystal oscillator 18 in the automatic control element 9. If the frequency stabilizing loop does not cause additional disturbances in the measuring system, the detector, according to this invention, maintains the good characteristics which it has with the reference oscillator 6 without using a crystal. At the same time, its frequency stability approaches the stability of the reference crystal oscillator 18.

For correction of the frequeny of the reference oscillator 6, a varicap diode 14' is incorporated into the tank circuit of the reference oscillator 6, and the coil of the tank ciccuit with the sample, which is to be chemically investigated, is located in the sample holder 4.

The reference oscillator 6 is composed of a low-noise video amplifier 14 and a limiter 16 from which nearly rectangular signals are fed through a resistor 15 in positive feedback connection to the input tank ircuit.

The signal "$f$" from the reference oscillator 6 and tee signal "$f_o$" from the crystal reference oscillator 18 are separately amplified in the amplifiers 17 and 19 of the automatic 9 and then mixed in the mixer 20 so that, at the output of the mixer a signal with the freuency $f_o-f$ appears. This latter signal is fed to a shaper stage 21 which at its output gives a rectangular signal with a constant amplitude.

From the output of the mixer 20 the signal is led also to the small monitor oscilloscope 29 in the automatic control element 12, by which the proper working condition of the automatic control elemet 9 is checked.

The rectangular signals are led from the shaper 21 to a rate meter 22 where they are converted to a DC voltage proportional to the frequeny difference $f_o-f$ and through a filter stage 23 to an operational amplifier 24 where they are compared with the reference DC voltage. The DC error signal is led through the flter stage 25 to the varicap diode and the low-noise amplifier 14 of the reference oscillator 6.

The stability of the nuclear magnetic resonance oscillator frequency improves with a rise of the amplifying factor in the loop up to a limit determined basically by the frequency stability of the reference crystal oscillator 18 and the reference DC voltage at the input into the operational amplifier 24.

The linearity of the frequency change in the frequency sweep is determined basically by the linearity of the reference voltage led from a generator 27 through a switch 30 as a reference signal to the input of the operational amplifier 24 instead the stabilized DC signal, as well as by the linearity of the rate meter 22.

In the case of a magnetic sweep, the stabilized DC voltage is led from a source 26 through the switch 30 to the 1nput of the operational amplifier 24.

The panel meter 28 is used to control the correction signal fed to the varicap diode.

What is claimed is:

1. An absorption detector for determining nuclear magnetic resonance with automatic frequency control, said detector comprising a sample holder including coils, a reference oscillator including a tank circuit coupled to said coils, a magnet including modulating coils and power coils and having a gap in which said holder is positioned; said refeence oscillator including a low-noise amplifier, a resistor, and a limtter connected in feedback rlation with said amplifier via said resistor; a low-frequency amplifier, a synchronous detector coupled via said low-frequency amplifier to said reference oscillator, an XY recorder coupled to said synchronous detector, a modulating oscillator coupled to said modulating coils, reference oscillator and synchronous detector, power supply means coupled to said power coils and to said XY recorder to determine the X position of the latter, and automatic control means coupled to said reference oscillator to control the frequency thereof; said automatic control means includng a crystal oscillator, a mixer coupled to said crystal oscillator and to said reference oscillator and beating the signals thereof, and a rate meter coupling said mixer to said low-noise amplifier; said detector further comprising a source of a reference voltage, a source of stabilized voltage, a switch coupled to said sources, and means coupled to said switch for selectively comparing the rate meter output with the reference voltage to generate an error signal which is fed to said low-noise amplifier and to provide for a magnetic sweep.

2. A detector as claimed in claim 1 coprising a varicap diode in said tank circuit.

3. A detector as claimed in claim 2 comprising a shaper between said mixer and rate meter and an oscilloscope connected to said mixer.

4. A detector as claimed in claim 3 comprising means to control said error signal.

* * * * *